United States Patent [19]
Capps

[11] Patent Number: 6,138,396
[45] Date of Patent: Oct. 31, 2000

[54] WATERFOWL DECOY TOWING SYSTEM

[75] Inventor: Ronnie Edward Capps, Dyersburg, Tenn.

[73] Assignee: Reelfoot Outdoor Company, LLC, Jackson, Tenn.

[21] Appl. No.: 09/400,143

[22] Filed: Sep. 21, 1999

[51] Int. Cl.[7] .................................................. A01M 31/06
[52] U.S. Cl. ........................................................... 43/3
[58] Field of Search ................................................ 43/2, 3

[56] References Cited

U.S. PATENT DOCUMENTS

| | | |
|---|---|---|
| 4,422,257 | 12/1983 | McCrory . |
| 4,535,560 | 8/1985 | O'Neil . |
| 4,910,905 | 3/1990 | Girdley et al. . |
| 5,974,720 | 11/1999 | Bowling . |

Primary Examiner—Jack W. Lavinder
Attorney, Agent, or Firm—Luedeka, Neely & Graham, P.C.

[57] ABSTRACT

A waterfowl decoy towing system moves a floating waterfowl decoy along a circuitous route on a surface of a body of water. The system includes a flexible line formed into a continuous loop, where the line is constructed of a material which is suitable for prolonged submersion in the body of water. Line guides support the flexible line at distributed positions which define the circuitous route. Anchors are attached to the line guides to anchor the line guides below the surface of the body of water at the distributed positions along the route. The system includes drive transfer means, such as a capstan attached to the shaft of an electric motor, for transferring a pulling force to the line to cause the line to move about the circuitous route as the line passes through the line guides. A decoy tether is attached to the flexible line for tethering the decoy. The direction and speed of the line movement is controlled by a motor controller disposed in a nearby duck blind. The system provides a life-like appearance to a floating waterfowl decoy by causing the decoy to move in a fashion similar to a live waterfowl swimming around in a meandering fashion.

9 Claims, 4 Drawing Sheets

WATERFOWL DECOY TOWING SYSTEM

TECHNICAL FIELD

The present invention is generally directed to waterfowl decoys. More particularly, the invention is directed to a system for providing movement to floating waterfowl decoys.

BACKGROUND AND SUMMARY OF THE INVENTION

One of the greatest challenges in waterfowl hunting is attracting waterfowl to within gunshot range of the hunter. To attract waterfowl, hunters typically place a spread of anchored floating decoys on the surface of a body of water adjacent to the hunters' blind. However, this presentation of the decoys needs improvement as it may not provide a presentation sufficient to attract waterfowl.

The foregoing and other needs are met by an apparatus for traveling a floating waterfowl decoy along a predetermined route adjacent a surface of a body of water. The apparatus includes a flexible line formed into a continuous loop, where the line is constructed of a material which is suitable for prolonged submersion in the body of water. Line guides movably support the flexible line at desired positions which define the circuitous route. Anchors are attached to the line guides to anchor the line guides below the surface of the body of water at the distributed positions along the route. The apparatus includes a drive structure for applying a pulling force to the flexible line to cause the flexible line to move about the circuitous route. A decoy tether is attached to the flexible line for tethering a decoy.

In another aspect, the invention provides a method for towing a floating waterfowl decoy on a surface of a body of water. The method includes anchoring multiple line guides below the surface of the body of water at distributed positions defining a circuitous route, and supporting a continuous loop of flexible line at the distributed positions along the route using the line guides. The method also includes tethering the floating decoy to the flexible line, and moving the flexible line around the circuitous route, thereby causing the floating decoy to move adjacent the surface of the water and approximately along the circuitous route.

Thus, the present invention provides a life-like appearance to a floating waterfowl decoy by causing the decoy to move like a live waterfowl swimming around in a meandering fashion. Also, the motion imparted by the invention causes the decoy to create a wake, which is the sort of water feature that makes a decoy spread appear even more enticing to waterfowl flying above. Further, on extremely cold nights, the invention may be left in continuous operation to keep the surface of the water in continuous motion, thus preventing a decoy spread from being frozen in.

BRIEF DESCRIPTION OF THE DRAWINGS

Further advantages of the invention will become apparent by reference to the detailed description of preferred embodiments when considered in conjunction with the drawings, which are not to scale, wherein like reference characters designate like or similar elements throughout the several drawings as follows.

DETAILED DESCRIPTION OF THE PREFERRED EMBODIMENT

Figure 1:
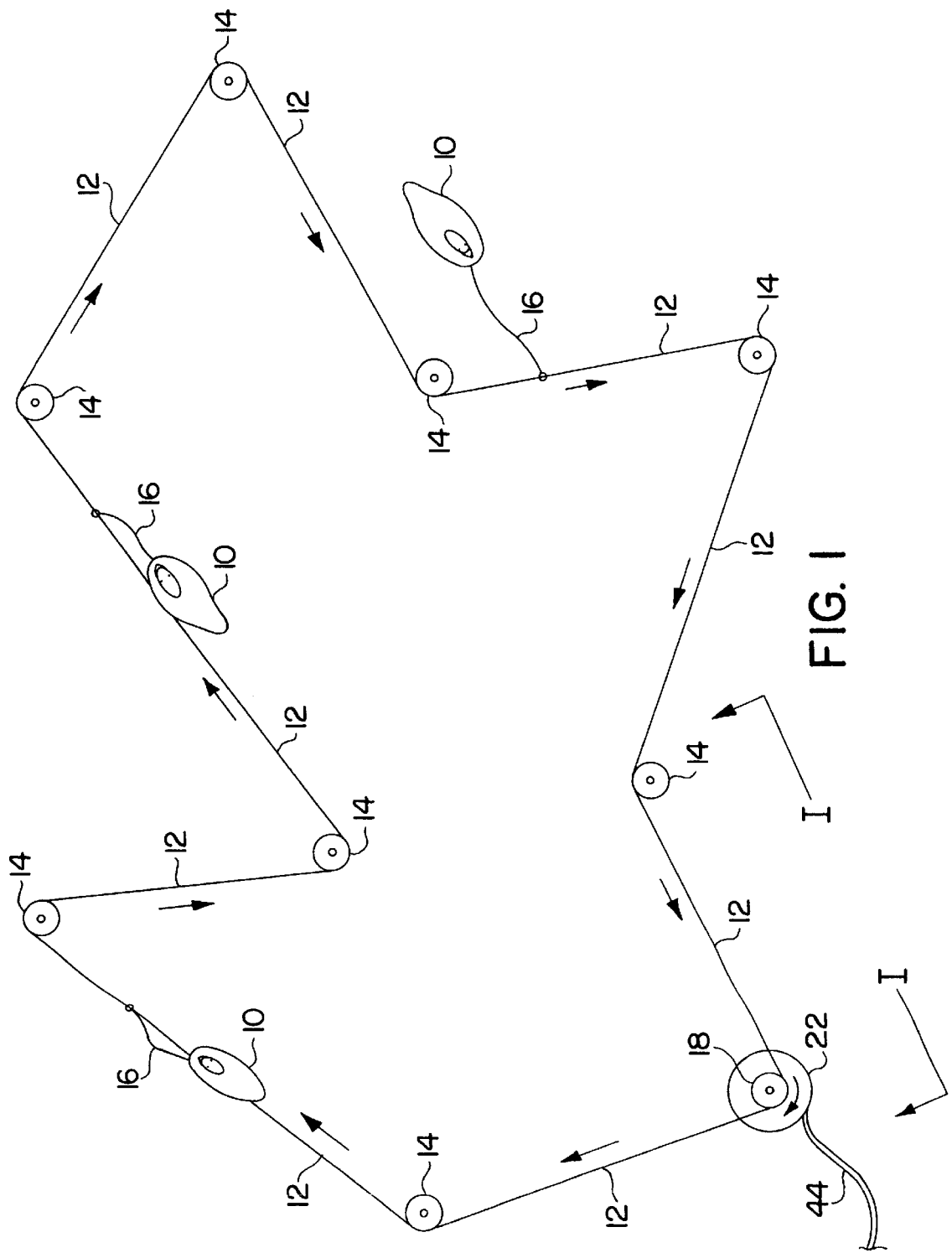
FIG. 1 is a top view of a waterfowl decoy towing system according to a preferred embodiment of the invention.
Figure 2:
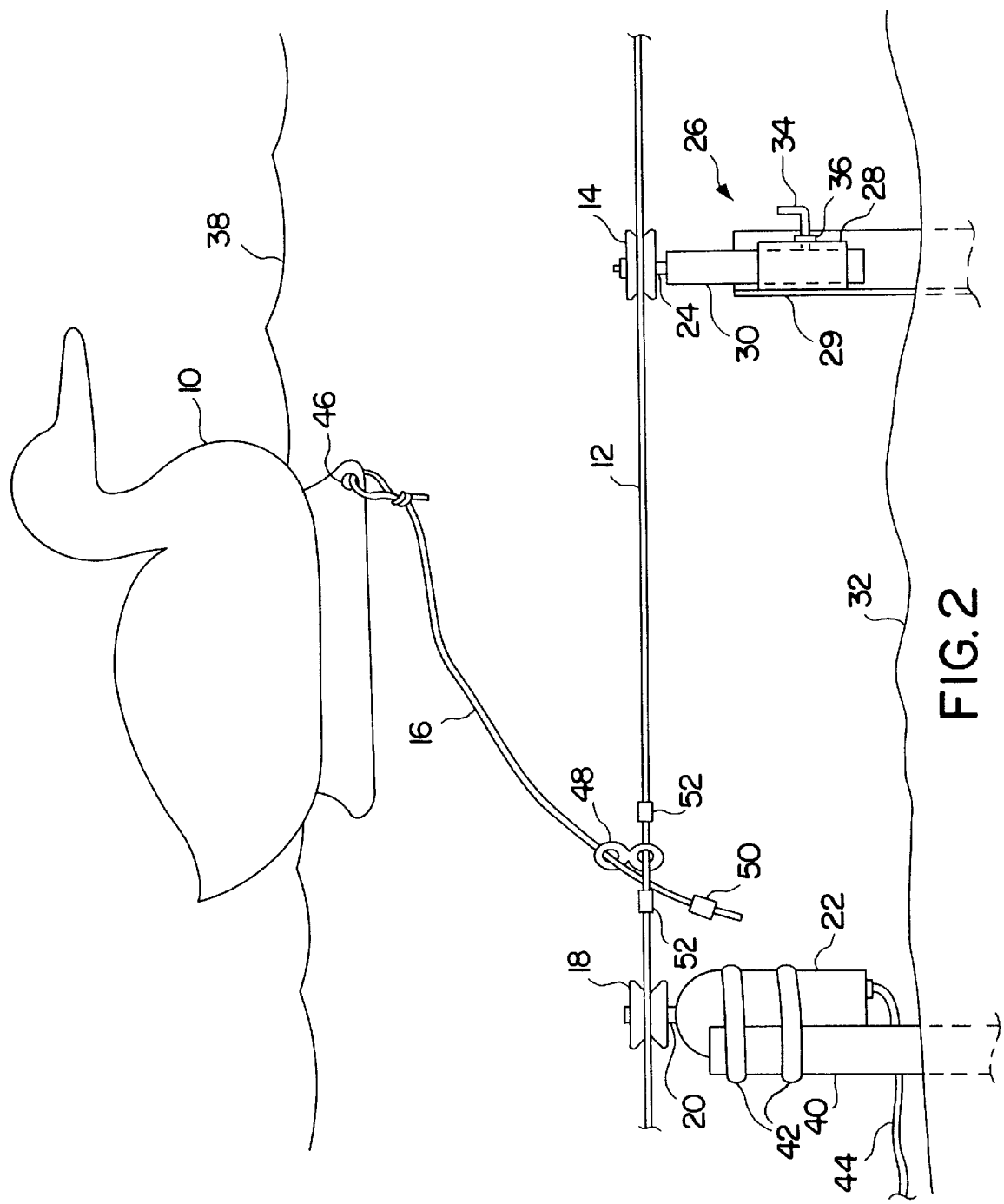
FIG. 2 is a left-side elevational view of a waterfowl decoy towing system according to a preferred embodiment of the invention.

Shown in FIG. 1 is a view, looking down from above, of an apparatus for moving waterfowl decoys 10 about a preferably circuitous route adjacent the surface of a body of water. The apparatus preferably includes a flexible line 12 formed into a continuous loop. The line 12, which is preferably about 0.08 inch in diameter, is constructed of a material, such as polypropylene or polyethylene, that is suitable for prolonged submersion in the body of water. The line 12 is supported by multiple line guides, such as pulleys 14, that are distributed about the circuitous route. One or more floating waterfowl decoys 10, consisting of buoyant material shaped to resemble a type of waterfowl, are tethered to the line 12 by decoy tethers 16. With reference to FIG. 2, a capstan 18 acts as a drive transfer device for transferring a pulling force to the flexible line 12 to cause the flexible line 12 to move in a desired direction about the circuitous route. The capstan 18, which is attached to a shaft 20 of a motor 22, rotates in response to torque applied to the shaft 20 by the motor 22. The flexible line 12 contacts and frictionally engages the capstan 18 and is pulled thereby as the capstan 18 rotates. As the flexible line 12 travels in response to the rotation of the capstan 18, the tethered decoys 10 are pulled about the route.

Each of the pulleys 14 rotates about a pulley shaft 24 that is attached to an anchor 26. Preferably, the anchor 26 includes a first cylindrical section, such as a pipe 28, and a second cylindrical section, such as a pipe 30. The pipe 28 may be attached, such as by spot-welds, to a section of angle-iron 29. The angle-iron section 29 is embedded in the soil at the bottom 32 of the body of water to a depth sufficient to firmly hold the anchor 26 in a substantially vertical position. Preferably, this depth is about two feet. In the preferred embodiment, the angle-iron section 29 has dimensions of 2×2×¼ inch. The outer diameter of the pipe 30 is preferably smaller than the inner diameter of the pipe 28, thus allowing the pipe 30 to be telescopically inserted into the pipe 28 as shown in FIG. 2. A locking bolt 34 is threaded through a nut 36 affixed to the pipe 28. The bolt 34 passes through a hole in the pipe 28 and makes contact with the pipe 30, thus locking the pipe 30 into place when the bolt 34 is tightened. In this manner, the height of the pulley 14 relative to the bottom 32 and/or relative to the water's surface 38 may be adjusted and maintained.

As shown in FIG. 2, the motor 22, such as a 12 volt direct current electric trolling motor of the type used on recreational fishing boats, is attached to a motor stake 40. In a preferred embodiment, the motor stake 40 is a length of angle-iron which is securely attached to the motor 22 as by straps 42. Alternatively, the stake 40 may be bolted or otherwise secured to the motor 22. The stake 40 is embedded in the soil on the bottom 32 to a depth of about two feet to firmly hold the motor 22 in a substantially vertical position as shown. Power is supplied to the motor 22 as by a power cable 44 which is connected to a power source, such as a 12 volt battery, in a nearby duck blind.

The shaft 20 of the motor 22 rotates when electric power is applied to the motor 22. Affixed to the shaft 20 is the capstan 18 which rotates with the shaft 20. Due to tension in the line 12, the line 12 presses firmly against the capstan 18. Tension in the line 12 may be created by making the circumference of the loop of line 12 somewhat less than the total length of the route created by the distributed pulleys 14. Since the line 12 is preferably made of polypropylene or polyethylene, it may be stretched somewhat as it is routed about the pulleys 14 and the capstan 18 to create the desired tension in the line 12.

One end of the tether 16 is tied to the decoy 10 at a tether attachment point 46. The other end of the tether 16 passes through one side of a section of chain link 48, preferably made of stainless steel. Although the tether 16 may slide and twist freely in the section of chain link 48, the tether may be prevented from pulling out of the chain link section 48 as by a brass or stainless steel bead 50 having an outer diameter that is larger than the inner diameter of the chain link section 48. Preferably, a rubber grommet lines the inner diameter of the bead 50 so that the bead 50 may be securely clamped down onto the tether 16 without damaging the tether 16. Alternatively, a knot tied in the tether 16 may be used to prevent the bead 50 from sliding off the end of the tether 16.

As depicted in FIG. 2, the line 12 passes through the other side of the chain link section 48. The chain link section 48 is maintained at a particular position on the line 12 by a pair of brass or stainless steel beads 52 having outer diameters larger than the inner diameter of the chain link section 48. Similar to the bead 50, the beads 52 are secured to the line 12 by clamping the beads 52 down onto the line 12. As FIG. 2 indicates, some distance is maintained between the two beads 52 so that the chain link section 48 may freely slide between the beads 52. Also, the chain link section 48 may freely rotate about the line 12 to avoid twisting and tangling of the line 12 and the tether 16. As shown in FIG. 1, several decoys 10 may be attached at selected, preferably spaced-apart locations along the line 12 in the manner described above.

Figure 3:
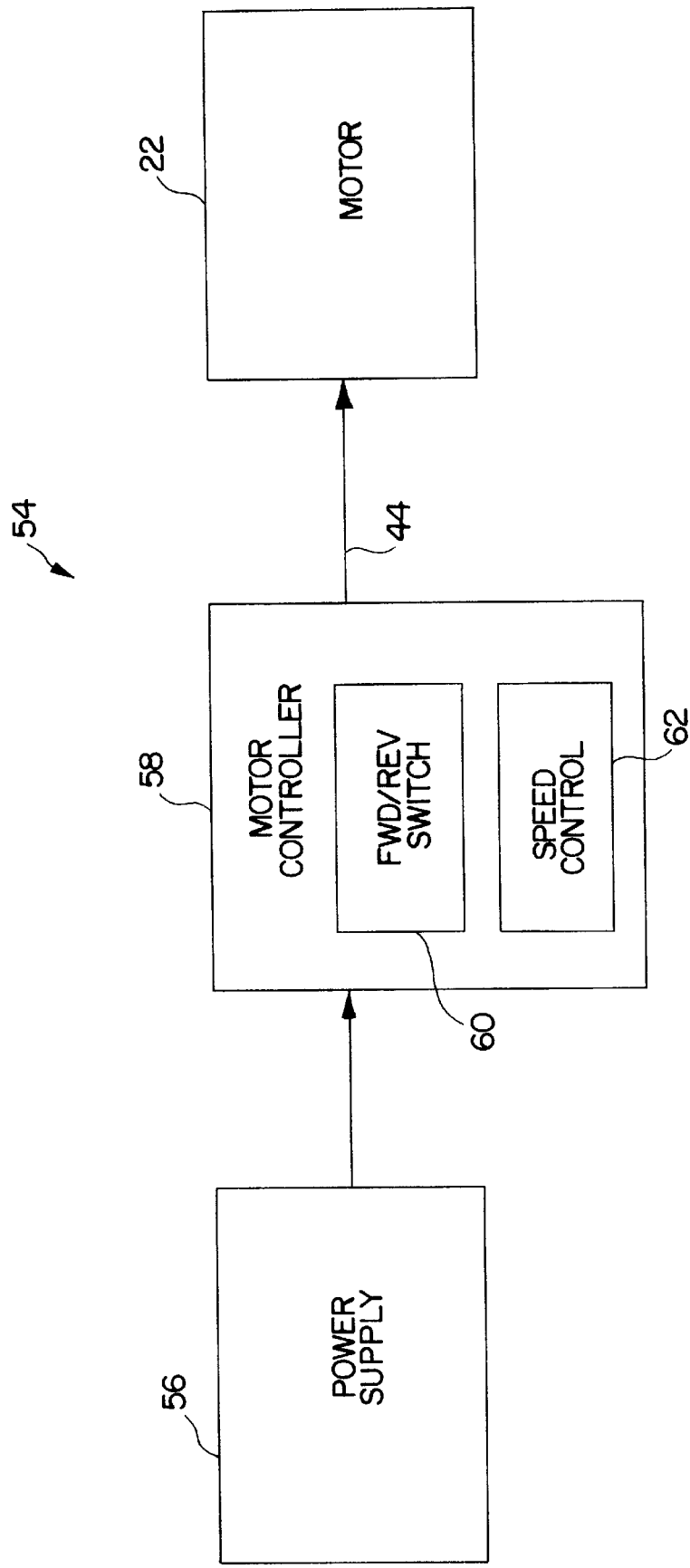
FIG. 3 is a functional block diagram of an electrical system for powering a waterfowl decoy towing system according to a preferred embodiment of the invention.

Shown in FIG. 3 is a functional block diagram of an electrical system 54 for use in the invention. The system 54 preferably includes a power supply 56, such as a 12 volt battery, provides power to a motor controller 58. The motor controller 58 preferably includes a forward/reverse switch 60 and a speed control 62, such as a variable potentiometer. Preferably, the power supply 56 and the motor controller 58 are located in a relatively dry area in the duck blind. The motor controller 58 is connected to the motor 22 by the cable 44.

To operate the invention, an operator in the duck blink applies power to the motor 22 by setting the forward/reverse switch 60 on the controller 58 to either forward or reverse. In response, the motor 22 rotates the shaft 20 which causes rotation of the capstan 18. Due to friction between the capstan 18 and the line 12, the capstan 18 imparts a pulling force to the line 12, thus causing the line 12 to move in response to the rotation of the capstan 18. The pulling force provided by the capstan 18 causes the line 12 to move as indicated by the arrows in FIG. 1. As the line 12 moves, so does the chain link section 48, thus providing the pulling force to the tether 16. In this manner, the decoy 10 is towed about the route defined by the distributed pulleys 14.

Since the length of the tether 16 is preferably somewhat greater than the distance between the line 12 and the water's surface 38, the decoy 10 will occasionally have components of motion that are not parallel to the line 12. These components of motion, which are created in part by wind, water movement, and the inertia of the decoy 10, provide a more random and life-like appearance to the movement of the decoy 10 as it travels around the circuit. In this regard, the line 12 is preferably located, and the length of the tethers 16 selected, so that the decoys 10 remain fully floating at all times, with a small degree of slack to permit some random motion. The length of the tethers 16 may also be varied to impart different motion characteristics to different ones of the decoys 10.

By adjusting the speed control 62, an operator may vary the speed at which the decoy 10 moves about the circuit. Further, the operator may use the forward/reverse switch 60 to alter the direction of the decoy's motion. Thus, a skilled operator may cause the decoy 10 to occasionally make swift changes in direction, such as may be expected of swimming waterfowl.

Figure 4B:
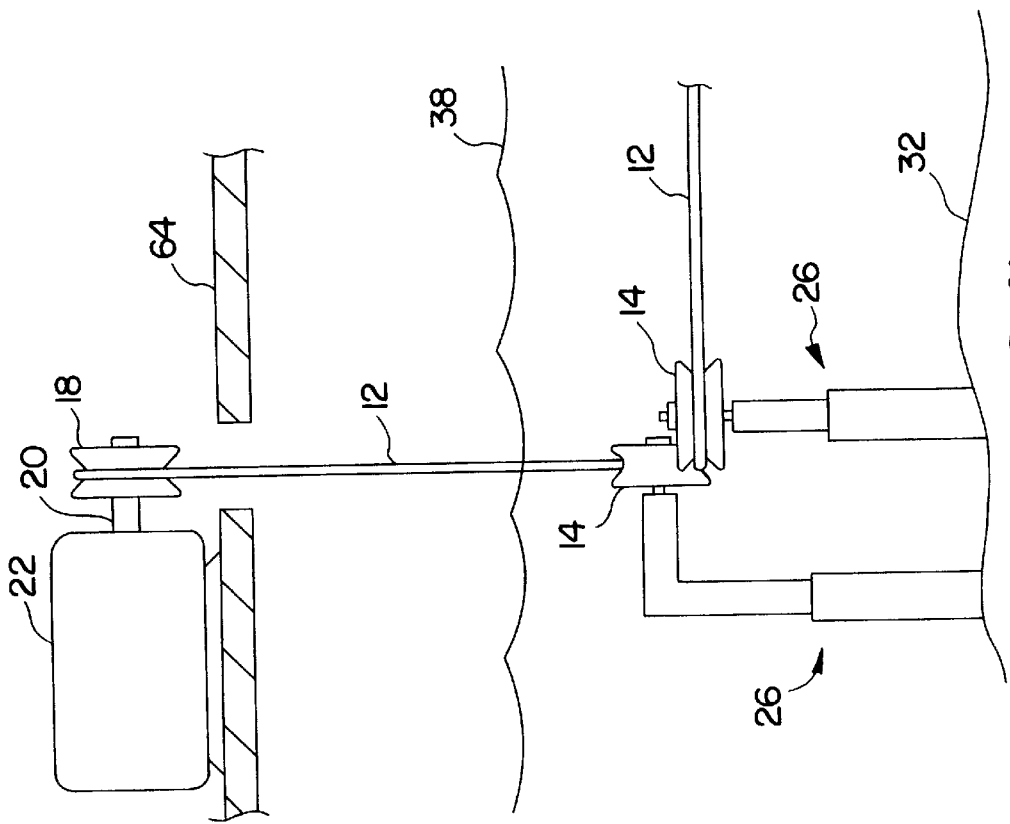
FIGS. 4a and 4b depict drive arrangements for the towing system according to alternative embodiments of the invention.
Figure 4A:
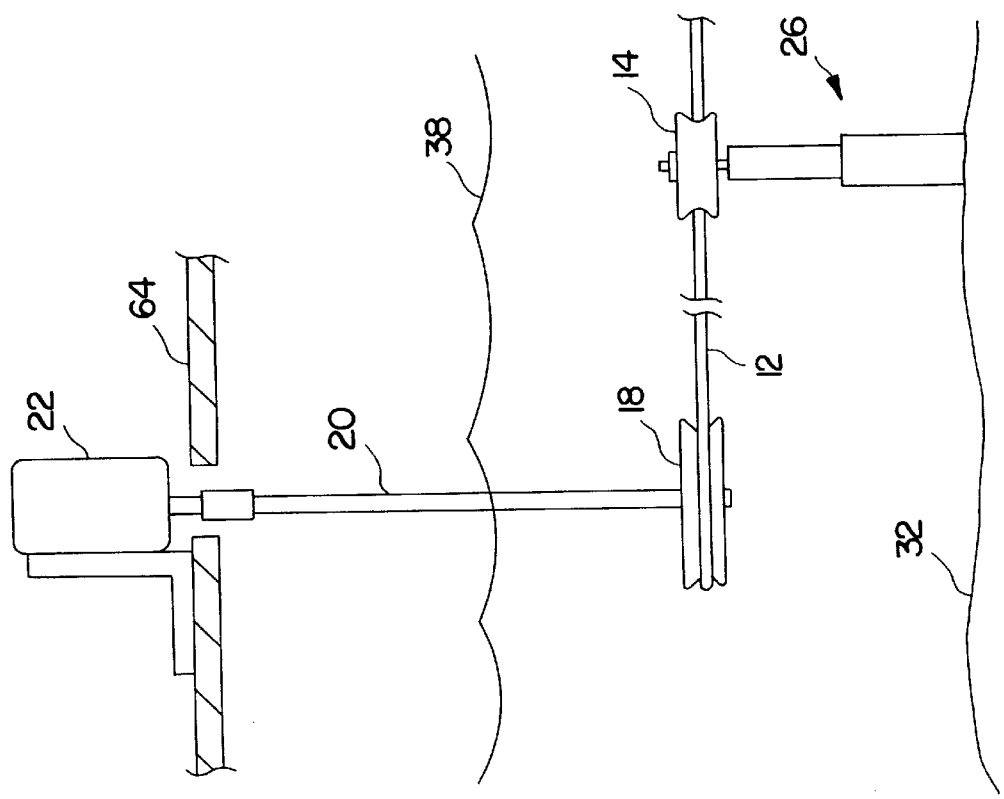

As depicted in FIGS. 4*a* and 4*b*, in alternative embodiments of the invention, the motor 22 is attached to the duck blind 64 above the water's surface 38, thereby permitting use of a motor that is not designed for prolonged underwater exposure. Since the embodiments of FIGS. 4*a* and 4*b* would bring a decoy 10 under the blind 64, these embodiments do not provide for the decoy 10 to make a complete trip around the circuit in a single direction. Thus, with these alternative embodiments, the direction of line movement would typically have to be reversed when the decoy 10 approaches the blind 64.

In other embodiments, the capstan 18 may be driven as by a hand crank, a bicycle-type pedal arrangement, or other manually-powered drive system.

It is contemplated, and will be apparent to those skilled in the art from the preceding description and the accompanying drawings that modifications and/or changes may be made in the embodiments of the invention. Accordingly, it is expressly intended that the foregoing description and the accompanying drawings are illustrative of preferred embodiments only, not limiting thereto, and that the true spirit and scope of the present invention be determined by reference to the appended claims.

What is claimed is:

1. An apparatus for traveling a floating waterfowl decoy continuously around a predetermined route adjacent a surface of a body of water, the apparatus comprising:

a continuous loop of flexible line constructed of a material which is suitable for prolonged submersion in the body of water;

a plurality of line guides for movably supporting the continuous loop at a plurality of desired positions which define the predetermined route;

a plurality of anchors, each of which is securely attached to a corresponding one of the plurality of line guides, for anchoring the line guides below the surface of the body of water at the desired positions along the route;

drive means for applying a force to the loop to cause the loop to move around the predetermined route, the drive means operable to maintain continuous operation to continuously cycle the loop around the route; and a decoy tether attached to the loop for tethering a decoy to the loop.

2. The apparatus of claim 1 further comprising:

a waterfowl decoy comprising buoyant material shaped to resemble a type of waterfowl and having a tether attachment point which is disposed below the surface of the water when the decoy is floating on the surface of the water; and the decoy tether attached to the tether attachment point on the decoy.

3. The apparatus of claim 1 wherein the line guides comprise pulleys.

4. The apparatus of claim 1 wherein the anchors comprise stakes which may be removably implanted into a bottom of the body of water.

5. The apparatus of claim 1 wherein the drive means comprise:
   a motor submerged beneath the surface of the body of water, the motor having a rotatable shaft; and
   a capstan attachable to the shaft and rotatable in response to torque applied to the shaft by the motor,
   wherein the loop of flexible line contacts the capstan and is pulled thereby as the capstan rotates.

6. The apparatus of claim 5 wherein the motor comprises a 12 volt direct current electric motor.

7. The apparatus of claim 1 wherein:
   the plurality of line guides define the predetermined path to have a total length; and
   the continuous loop of flexible line has a circumference which is substantially equivalent to the total length of the route.

8. An apparatus for moving a floating waterfowl decoy in a desired circuit adjacent a surface of a body of water, the apparatus comprising:
   a waterfowl decoy comprising buoyant material shaped to resemble a type of waterfowl and having a tether attachment point which is disposed below the surface of the water when the decoy is floating on the surface of the water;
   a continuous loop of flexible line constructed of a material which is suitable for prolonged submersion in the body of water;
   a plurality of pulleys for supporting the continuous loop at a plurality of distributed positions which define the desired circuit;
   a plurality of stakes which may be removably implanted into a bottom of the body of water, each of the stakes being attached to a corresponding one of the plurality of pulleys, the stakes for anchoring the pulleys below the surface of the body of water at the distributed positions along the desired circuit;
   a motor having a shaft and submerged beneath the surface of the body of water, the motor for applying a torque to the shaft to cause the shaft to rotate in response thereto;
   a capstan attached to the shaft of the motor, the capstan for rotating in response to the torque applied to the shaft of the motor, for contacting the continuous loop, and for transferring a pulling force to the continuous loop as the capstan rotates, thereby causing the continuous loop to move about the desired circuit as the continuous loop passes through the pulleys; and
   a decoy tether attached to the tether attachment point on the decoy and attached to the continuous loop,
   where the motor and the capstan are together operable to maintain continuous operation to continuously cycle the loop around the circuit.

9. A method for towing a floating waterfowl decoy on a surface of a body of water about a continuous circuitous route, the method comprising the steps of:
   anchoring a plurality of line guides below the surface of the body of water at distributed positions defining the circuitous route;
   supporting a continuous loop of flexible line at the distributed positions along the route using the plurality of line guides;
   tethering the floating decoy to the continuous loop; and
   moving the continuous loop around the circuitous route,
   thereby causing the floating decoy to move adjacent the surface of the water and approximately along the circuitous route.

* * * * *